United States Patent
Sennett et al.

(10) Patent No.: US 9,826,344 B2
(45) Date of Patent: Nov. 21, 2017

(54) SYSTEMS AND METHODS FOR DETERMINING PREVIOUS OCCUPATION IN OR PROXIMATE TO AN ALERT AREA

(75) Inventors: DeWayne Allan Sennett, Redmond, WA (US); Brian Kevin Daly, Seattle, WA (US)

(73) Assignee: AT&T Mobility II LLC, Atlanta, GA (US)

(*) Notice: Subject to any disclaimer, the term of this patent is extended or adjusted under 35 U.S.C. 154(b) by 1387 days.

(21) Appl. No.: 12/057,956

(22) Filed: Mar. 28, 2008

(65) Prior Publication Data

US 2009/0247191 A1    Oct. 1, 2009

(51) Int. Cl.
    H04W 4/02    (2009.01)
    H04W 84/04   (2009.01)

(52) U.S. Cl.
    CPC ............ *H04W 4/02* (2013.01); *H04W 84/042* (2013.01)

(58) Field of Classification Search
    USPC ............... 455/404.1–404.2, 414.1–414.3, 455/456.1–457; 340/521, 539.13
    See application file for complete search history.

(56) References Cited

U.S. PATENT DOCUMENTS

| | | | |
|---|---|---|---|
| 6,054,928 A * | 4/2000 | Lemelson et al. .......... | 340/573.4 |
| 6,112,075 A | 8/2000 | Weiser .......................... | 455/404 |
| 6,115,599 A * | 9/2000 | Stilp .......................... | 455/404.1 |
| 6,295,454 B1 * | 9/2001 | Havinis et al. ............ | 455/456.3 |
| 6,317,604 B1 * | 11/2001 | Kovach et al. ............ | 455/456.5 |
| 6,397,040 B1 * | 5/2002 | Titmuss et al. ............ | 455/67.11 |
| 6,522,250 B1 * | 2/2003 | Ernst ..................... | G08B 27/00 340/539.1 |
| 6,608,559 B1 * | 8/2003 | Lemelson et al. ....... | 340/539.13 |
| 7,565,155 B2 * | 7/2009 | Sheha et al. ............. | 455/456.1 |
| 7,705,723 B2 * | 4/2010 | Kahn et al. ................... | 340/521 |
| 8,024,330 B1 * | 9/2011 | Franco .................... | G06F 17/30 707/724 |
| 8,200,186 B2 * | 6/2012 | Ashley et al. ............ | 455/404.2 |
| 2001/0028313 A1 * | 10/2001 | McDonnell et al. ..... | 340/870.07 |
| 2002/0042278 A1 * | 4/2002 | Crockett et al. .............. | 455/456 |
| 2003/0119529 A1 * | 6/2003 | Hirokawa ..................... | 455/456 |
| 2003/0134645 A1 * | 7/2003 | Stern ....................... | H04W 4/02 455/456.1 |
| 2003/0162557 A1 * | 8/2003 | Shida ...................... | H04M 3/42 455/521 |
| 2004/0110515 A1 * | 6/2004 | Blumberg .............. | G01C 21/20 455/456.1 |
| 2005/0085257 A1 * | 4/2005 | Laird ...................... | A61B 5/04 455/550.1 |
| 2006/0025106 A1 * | 2/2006 | Byers et al. .............. | 455/404.2 |
| 2006/0040639 A1 | 2/2006 | Karl et al. ................. | 455/404.1 |

(Continued)

*Primary Examiner* — Daniel Lai
*Assistant Examiner* — Frank Donado
(74) *Attorney, Agent, or Firm* — Baker & Hostetler LLP

(57) ABSTRACT

Systems and methods for determining whether a mobile device was within a specified area and for providing a location history of a mobile device are disclosed. A request may be received from a device which inquires about the location history of a mobile device. The request may include a time period and/or a location. The relevant location history of the device may be determined and provided in response. A request may also be received which inquires whether a mobile device was within a known alert area. The location history of the device may be correlated to the alert area and a response provided.

14 Claims, 9 Drawing Sheets

(56) References Cited

U.S. PATENT DOCUMENTS

| | | | |
|---|---|---|---|
| 2006/0099970 A1* | 5/2006 | Morgan et al. | 455/456.6 |
| 2006/0166679 A1* | 7/2006 | Karaoguz et al. | 455/456.1 |
| 2006/0194592 A1* | 8/2006 | Clough | 455/456.3 |
| 2006/0235833 A1* | 10/2006 | Smith et al. | 707/3 |
| 2006/0270421 A1* | 11/2006 | Phillips et al. | 455/457 |
| 2007/0072583 A1* | 3/2007 | Barbeau et al. | 455/404.2 |
| 2007/0072620 A1* | 3/2007 | Levitan | 455/456.1 |
| 2007/0124395 A1* | 5/2007 | Edge | H04H 20/59 709/206 |
| 2007/0244633 A1* | 10/2007 | Phillips | G08B 21/0236 701/408 |
| 2008/0139165 A1* | 6/2008 | Gage et al. | 455/404.1 |
| 2009/0005077 A1* | 1/2009 | Forstall et al. | 455/456.2 |
| 2009/0132163 A1* | 5/2009 | Ashley et al. | 701/206 |
| 2009/0170467 A1* | 7/2009 | Nowlan et al. | 455/404.1 |
| 2010/0263389 A1* | 10/2010 | Bryngelson et al. | 62/50.2 |

\* cited by examiner

SYSTEMS AND METHODS FOR DETERMINING PREVIOUS OCCUPATION IN OR PROXIMATE TO AN ALERT AREA

TECHNICAL FIELD

The technical field generally relates to communications systems and more specifically relates to systems and methods for determining if a mobile device was previously in or proximate to an alert area.

BACKGROUND

The threat of exposure to dangerous chemical, biological, or radioactive agents or other delayed-effect substances is an unfortunate reality in the modern world. Today, one may be unknowingly exposed to hazards which may have effects that are not immediately apparent. This may be due to accidents or intentional acts, such as terrorist attack. An unknowing victim may leave an incident area and go on about his or her life until the symptoms of exposure to a dangerous substance begin to manifest themselves, at which time the effectiveness of treatment may be reduced or eliminated. Therefore, it is important for a person to be able to determine if he or she was present in an area affected by a release of a dangerous substance. Such a person should not have to acquire or carry special equipment to do so. A person who may have been affected by an incident should be able to easily access information which lets them determine whether the person was affected using commonly available equipment, such as a mobile device or a computer, because such incidents may affect anyone.

SUMMARY

A request is received from a user of a mobile device inquiring about the proximity of the device to an area. The request may specify a specific time period, area, mobile device identifier, and/or other user preferences. The area may be affected by a release of a substance, or may be any other bounded area. The systems and methods described herein may provide a response to the request that includes a listing of locations of the mobile device over a time period, and/or a listing of time periods during which the mobile device was in a specified area.

In an alternative embodiment, a request may be received from a user inquiring as to whether a mobile device was in an alert area. An alert area may be any area which may be known to a network. An alert area may also be limited in time. The network, or devices associated therewith, may determine whether the mobile device associated with the request was in the alert area.

Requests and responses to requests about alert areas and proximity of mobile devices thereto may be sent and received from the mobile device, or may be sent and received from other devices separate from the mobile device. The format of responses may be any effective format, including text messages and email.

Other objects, features, and advantages of the present invention will become apparent after review of the Brief Description of the Drawings, Detailed Description, and the Claims.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described. It should be understood that the explanations illustrating data or signal flows are only exemplary. The following description is illustrative and non-limiting to any one aspect.

Incidents may occur where dangerous substances are released into an area, and those in the area may be affected by the substances. Such effects may not be apparent until many hours or days after the incident. The release may be due to accident or malicious activity. The incident area may be any area where a dangerous substance, such as a radioactive, biological, or chemical agent, or any other harmful substance, has been released and/or has spread. As a result of the release, the substance may spread throughout an incident area, affecting people who are not at the site of the release. Various means and methods of determining the shape, size, and location of an incident area created by a release of a substance are known to those skilled in the art and will not be recited herein. All such means and methods are contemplated as within the scope of the present disclosure.

Figure 1:
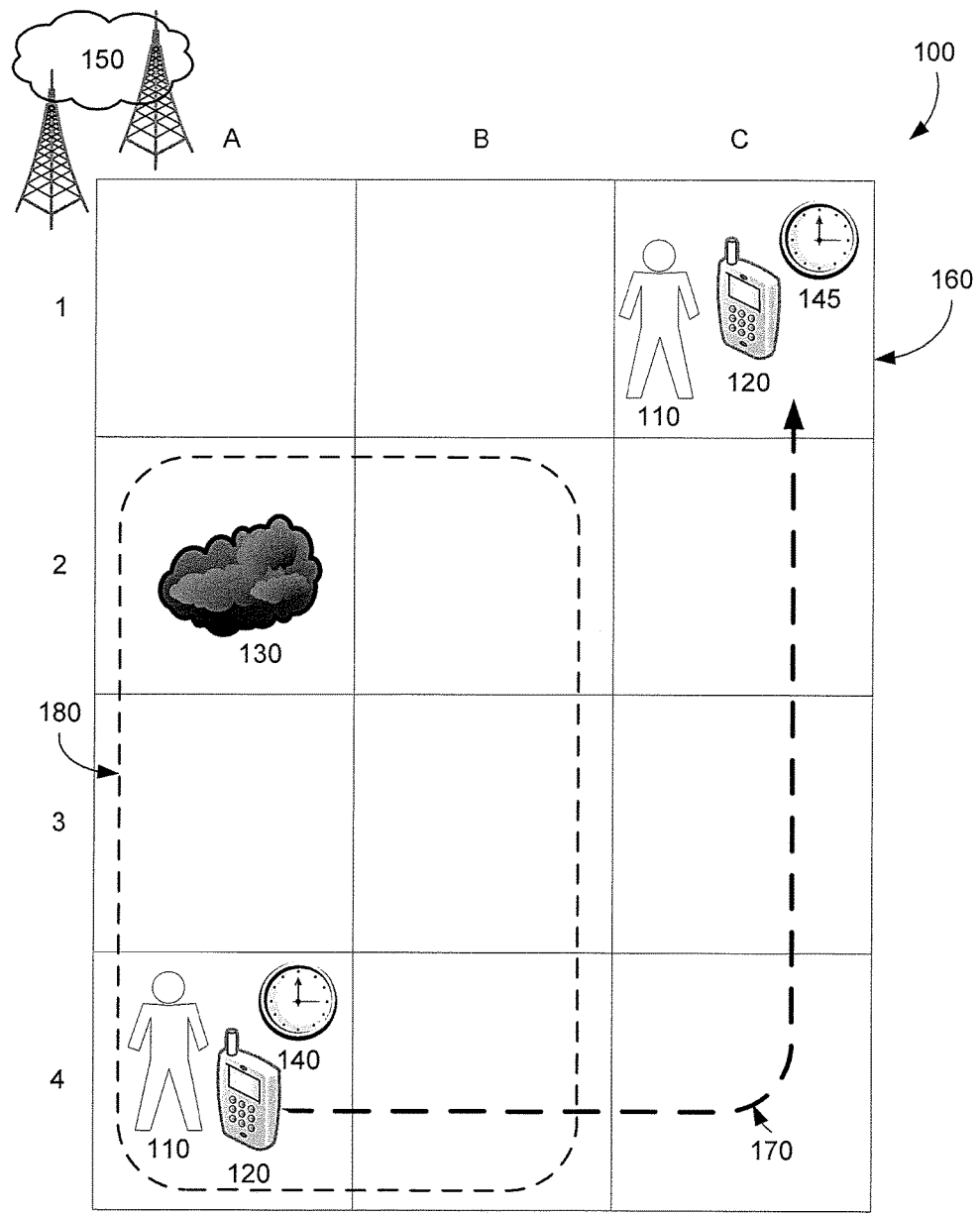
FIG. 1 is a block diagram of a user and an area in which the present method and system may be implemented.

FIG. 1 illustrates an exemplary, non-limiting area 100 in which the present disclosure may be implemented. Area 100 is an example of a geographical area in which a mobile communications device may be transported and/or operated.

Area 100 may include portions which are covered by one or more wireless networks, enabling a mobile device to function in a home network, a roaming network, or both. Area 100 may also include portions which are not covered by any wireless network in which the user's mobile device can operate. The size and shape of area 100 can be any size and shape possible for a geographical area. Area 100 as illustrated in FIG. 1 is only exemplary and for purposes of description and is not intended to limit the present subject matter in any way.

User 110 is traveling in area 100 with mobile device 120. Mobile device 120 may be any device that is capable of operating on a wireless mobile communications network and that communicates with other devices using, at least in part, a wireless network. Examples of such devices include, but are not limited to, mobile telephones, mobile computers, personal data assistants ("PDAs"), navigation systems, vehicle communication systems, and wirelessly networked computers. Any device which can communicate with any other device by communicating, at least in part, wirelessly through a wireless network is contemplated as being within the scope of the present disclosure.

Mobile device 120 may include global positioning system ("GPS") components and/or software, enabling it to communicate with GPS satellites and determine its own location, speed, direction, and the current time. Mobile device 120 may communication with any GPS or similar system, including, but not limited to, NAVSTAR GPS, the European Galileo positioning system, the COMPASS navigation system, and the Indian Regional Navigational Satellite System (IRNSS), and satellites and/or other devices associated with such systems. All such systems, satellites, and devices are contemplated as within the scope of the present disclosure.

Mobile device 120 may be constructed such that it can communicate GPS-derived location and direction information to a telecommunications network, other devices, and/or user 110. Mobile device 120 may include other means of determining its own location, speed, and/or direction, including receiving such information from a telecommunications network, or deriving such information from the use of technologies well known to those skilled in the art that utilize one or more cellular towers and analysis of signal strength, time delays, angles of arrival, or other measurements to determine a device's location. Such locating means include, but are not limited to, triangulation and hyperbolic fixing schemes. Such locating means may use time delays between mobile device 120 and two or more cellular towers to determine a relatively precise location for mobile device 120. The various means and methods of locating a device using cellular network measurements, including the use of time delay and/or signal strength to determine the location, speed, and/or direction of a mobile device, are well known to those skilled in the art, and therefore will not be recited herein. Any means of determining a mobile device's current or past location, speed, and/or direction are contemplated as within the scope of the present disclosure.

Mobile device 120 is serviced, at least in part, by network 150. Network 150 may be any network that facilitates wireless communications, may also include wired communication capabilities, and may communicate with other wired and wireless networks. Any and all such networks are contemplated as within the present disclosure. Examples of such networks include telephony radio networks such as global system for mobile communication ("GSM") networks and code division multiple access ("CDMA") networks, wireless computer networks such as Wi-Fi and IEEE 802.11 networks, and wired networks such as local area networks ("LANs"), wide area networks ("WANs"), intranets, and the Internet. Network 150 represents any possible combination of such networks, including a wireless network that may connect to the Internet and communicate with other devices that are connected, directly or indirectly, to the Internet.

Area 100 is overlaid by virtual grid 160. Grid 160 is not physically present in area 100, but serves as a logical tool for referencing sections of area 100. Grid 160 divides area 100 into sections that may be easily referenced by grid coordinates. For example, user 110 is beginning his or her journey in section A4 of grid 160. User 110 is traveling to section C1 of grid 160 along route 170. Grid 160 serves only as an example of how an area, such as area 100, may be logically divided and referenced. Another example of how a geographical area may be divided and referenced is by ZIP codes. Yet another example of how a geographical area may be divided and referenced, particularly one served by a wireless telecommunications network, is by tower locations. For instance, the coverage area of each tower may be designated as a geographical division. Any other method or means of creating and referencing sections or portions of a geographical area are contemplated as within the scope of the present disclosure.

Route 170 may be a path of travel, along public roads, walkways, private areas, or any other path of travel which user 110 may be traveling. Route 170 may or may not have wireless coverage enabled by network 150, or may include areas or sections that have coverage as well as areas or sections that do not. Any path of travel is contemplated as within the scope of the present disclosure.

Within area 100, an release of a dangerous substance may have occurred at site 130 in section A2 of grid 160. The release may be a release of a chemical substance, a biological substance, a radioactive substance, or of any substance that may be capable of spreading in an area, through the air or over the ground, or in any effective manner. Such a substance may be dangerous and capable of causing harm or death to living organisms. Alternatively, such a substance may be harmless, yet of interest to people in the area or in general. The release at site 130 may create an affected area 180. Affected area 180 includes portions of area 100 that are located in sections A2, A3, A4, B2, B3, and B4 of grid 160. Affected area 180 may be determined by evaluating the substance released and the environmental factors involved, such as wind speed and direction, water flow speed and direction, temperature, volatility of the released substance, volume and/or mass of released substance, or any other factor. Many means and methods of determining an area affected by a release of a substance are known to those skilled in the art, and all such means and methods are contemplated as within the scope of the present disclosure.

User 110 may be in section A4 of area 100 at time 140. Time 140 may be the same time or a time shortly after the release of a substance at site 130, so that at time 140, user 110 was within affected area 180. User 100 may travel along route 170, arriving at section C1 of area 100 at time 145. Time 145 may be any amount of time after time 140. Section C1 of area 100 may not be within affected area 180 at time 145.

Network 150 may be collecting location information from mobile device 120, such as GPS coordinates. Network 150 may instead be determining location information for mobile device 120 using other means, such as collecting information from towers communicating with mobile device 120 and performing triangulation, or any other means of determining location information known to those skilled in the art. Network 150 may also collect and/or determine time information, and may associate time information with location information for mobile device 120, creating a record of the location of mobile device 120 at specific times.

User 110 may learn about the release at site 130 through any available means, including television, newspaper, radio, or Internet news reports. User 110 may realize that he or she was in the vicinity of site 130 and may wish to know whether he or she may have been in affected area 180. Therefore, user 110 may transmit a location history request to network 150, or to a system or device associated with or otherwise in communication with network 150, to determine a history of user 110 locations over a period of time. In another alternative, user 110 may transmit an affected area proximity determination request to determine if user 110 was in affected area 180 at a time when user 110 may have been affected by the release.

In one embodiment, user 110 issues such a request by operating mobile device 120 to transmit the request to network 150. Mobile device 120 may have installed on it or otherwise be configured with an application which facilitates such requests. Such an application may be a software program which communicates, automatically or on activation by user 110, with network 150. For example, user 110 may activate a menu item, actual or virtual button, or some other input on mobile device 120 to generate and transmit a request. Alternatively, mobile device 120 and/or an application thereon may automatically send requests, in one embodiment at periodic intervals that may be predetermined by user 110, network 150, mobile device 120, or an application on mobile device 120, to network 150 to determine if mobile device 120 has been in an affected area such as affected area 180.

In another embodiment, such a request may be transmitted to network 150 with a text message, instant message, email, voice message, or any other form of communication. In yet another embodiment, user 110 may access a website or other Internet portal which allows user 110 to transmit a request to network 150. Such a service may be provided as part of user's 110 wireless network account. Alternatively, user 110 may operate an application installed on or otherwise configured on another computing device or any other capable device which facilitates user's 110 transmission of a location history request or an affected area proximity determination request.

Such a request may be transmitted to network 150 or an associated device or system through any means or method known to those skilled in the art. Many means and methods of transmitting data from one device to another are known, and all such means and methods, including wired and wireless means, are contemplated as within the scope of the present disclosure.

Upon receiving a request from user 110, network 150 may evaluate the request, determine the relevant information, and transmit a reply to user 110. In one embodiment, the request may be for a history of locations over a specific period of time. For example, user 110 may transmit a request for a listing of all locations where network 150 maintained contact with mobile device 120 from time 140 through time 145. Network 150 may determine all such locations using various means and methods known to those skilled in the art. For example, network 150 may evaluate call detail records of calls made with mobile device 120. Alternatively, network 150 may examine location update records generated by location updates between mobile device 120 and network 150, or records associated with location-based services. In yet another alternative, network 150 may examine GPS data records associated with mobile device 120. Many methods and means of maintaining a history of locations where mobile device 120 may have been operating are known to those skilled in the art, and all such means and methods are contemplated as within the scope of the present disclosure.

In another embodiment, the request may be for a listing of times when user 110 may have been in affected area 180. For example, user 110 may provide area location information in the request, and network 150 may determine if and when user 110 was present in the provided area. In one embodiment, user 110 may provide a ZIP code in the request. In another embodiment, user 110 may use a computing application to indicate the location of affected area 180, for example by selecting a portion of a map. In another embodiment, user 110 may provide coordinates delineating affected area 180. Many other means and methods of describing an area and providing such information to a system are known to those skilled in the art, and all such means and methods are contemplated as within the scope of the present disclosure.

In yet another embodiment, network 150 may have knowledge of affected area 180 as an area affected by the release at site 130. Such knowledge may be provided to network 150 through any means known to those skilled in the art, including manual configuration of network 150 and automated processes to detect and configure network 150 with knowledge of affected area. In such an embodiment, user 110 may transmit a request that inquires of network 150 whether user 110 was in affected area 180 at a time when user 110 may have been affected by the release at site 130. Network 150 may then determine, using location records associates with mobile device 120 as described herein or any other effective means, whether mobile device 120 was present in affected area 180 at a time when user 110 may have been affected by the release. Means and methods of correlating the location history of a mobile device with a particular time period and location are known to those skilled in the art and are contemplated as within the scope of the present disclosure.

Once the results of the evaluation of the request by user 110 are obtained, such results are transmitted to user 110. The results may be transmitted to the device which transmitted the request, such as to mobile device 120 or to a computing device operated by user 110. Alternatively, the results may be transmitted to a different device. In one embodiment, user 110 may include in user's 110 request transmitted from mobile device 120 that the results be sent to an email account. Alternatively, user 110 may include a request that the results be sent to mobile device 120 when transmitting the request from another computing device. Any other combination of requesting device and results-receiving device are contemplated as within the scope of the present disclosure.

The results may be provided in any effective format or configuration. For example, a listing of times and locations may be provided. Alternatively, a listing of times for a specific location may be provided. In yet another alternative, network 150 may respond affirmatively or negatively to an inquiry of whether user 110 was present in affected area 180. Such a response may be accompanied by advice or notification of steps to take or authorities or entities to seek out in the event that it is determined that user 110 was in affected area 180 at a time when user 110 may have been affected by a release. Any other format or configuration of results is contemplated as within the scope of the present disclosure.

The results may be provided via email, text message, instant message, through an application, presented on a web page, via voice mail or voice data, or any other effective means or method. Any and all such means and methods are contemplated as within the scope of the present disclosure.

Figure 2:
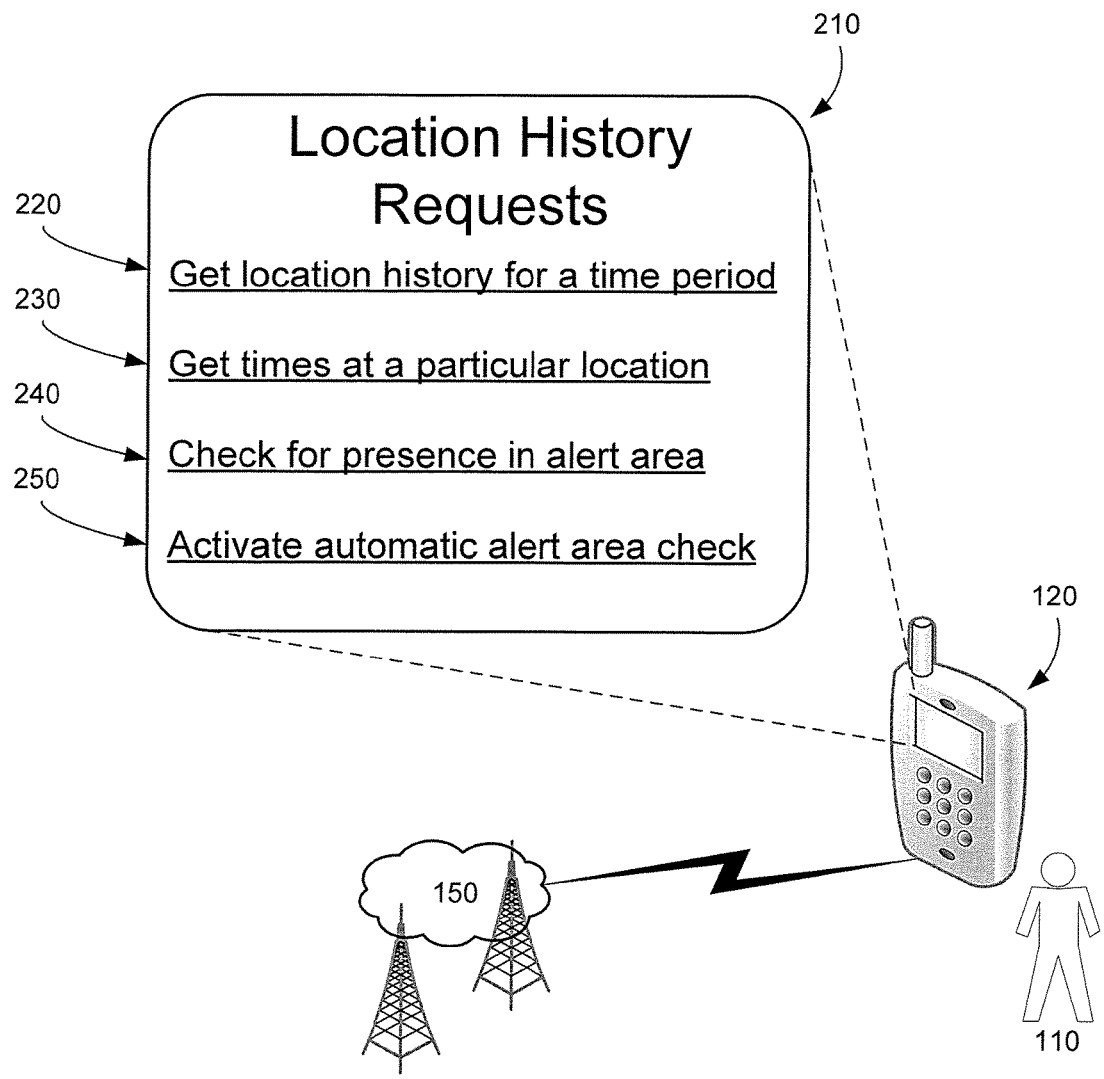
FIG. 2 is a block diagram of an exemplary non-limiting display on which one embodiment of the present matter may be activated.

FIG. 2 illustrates a non-limiting embodiment of an interface through which user 110 may transmit a request to network 150. Mobile device 120 may have a display 210. On display 210 may be presented options for requesting location information. Option 220 may allow user 110 to request location history for mobile device 120 over a set period of time. Activating option 220 may allow user 110 to enter a time period and submit the request. Option 230 may allow user 110 to request a listing of any times that mobile device 120 may have been operable in a particular area. Activating option 230 may allow a user to enter location information, such as a ZIP code or coordinates, and submit the request. Option 240 may allow user 110 inquire whether mobile device 120 has been within an alert area. An alert area may be any area which has been determined to be affected by a release of a substance, such as affected area 180 in FIG. 1.

In one embodiment, option 250 may allow user 110 to configure mobile device 120, or request configuration of network 150, to automatically check for the presence of mobile device 120 in an alert area. Activating option 250 may cause mobile device 120 to periodically send requests to network 150 inquiring whether mobile device 120 has been within an alert area. Alternatively, option 250 may cause network 150 to periodically check the location history of mobile device 120 and correlate that history to any alert area notifications it receives. If presence in an alert area is detected, network 150 or mobile device 120 may automatically notify user 110. Such automatic notification of presence in an alert area may be provided by a text message, instant message, email, voice call, or any other effective means. In one embodiment, such a notification is copied to more than one location. For example, a notification may be sent as a text message to mobile device 120 and as an email to an account associated with user 110. Any other methods and means of automatically checking for user's 110 presence in an alert area and providing automatic notification of such presence are contemplated as within the scope of the present disclosure.

Figure 3:
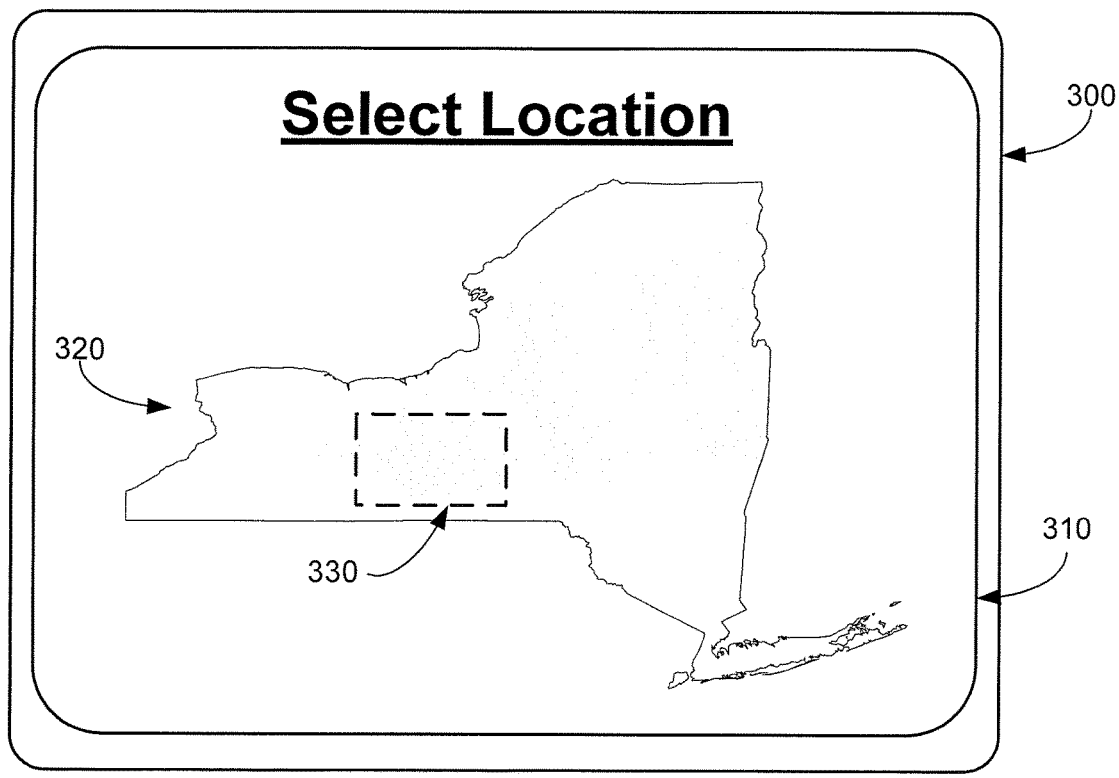
FIG. 3 is a block diagram of an exemplary non-limiting display on which one embodiment of the present matter may be activated.

In another embodiment, user 110 may select an area on a map about which to request information. FIG. 3 illustrates a non-limiting exemplary embodiment of the present subject matter. Map 320 is displayed on display 310, which may be on computer monitor 300. Alternatively, display 310 may be on a mobile device or other computing device with a display. Map 320 may be any map that illustrates an area, including a road map, topological map, or satellite map. User 110 may select area 330 by using a mouse or other input device. Area 330 may be provided to network 150 with a request for a history of the presence of mobile device 120 in area 330. Alternatively, area 330 may be provided to network 150 with a request to return information about any alerts or known releases of substances within area 330. Any other request related to a selected area may be presented to network 150 with the selection of area 330, and all such requests are contemplated as within the scope of the present disclosure. Network 150 may then transmit a reply as described herein.

Figure 4:
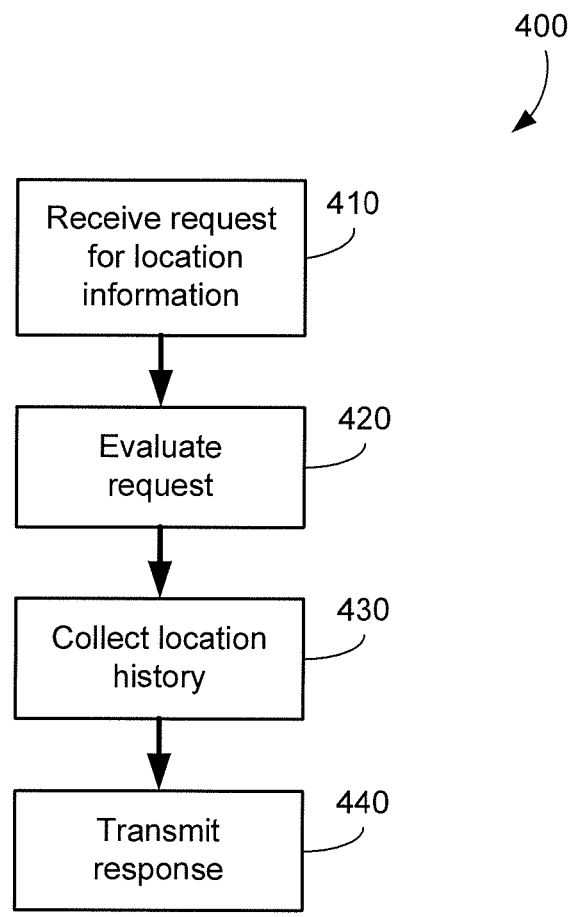
FIG. 4 is a flow diagram of an exemplary, non-limiting method of implementing the present subject matter.

FIG. 4 is a flow diagram of non-limiting, exemplary method 400 of implementing the present subject matter. At block 410, a request is received for location information. Such a request may be transmitted from a mobile device by a user operating the mobile device. Alternatively, the request may be transmitting from any other type of device, such as a personal computer or a navigation system. The request may contain identifying information for the device in question. For example, the request may include the telephone number of the device for which a location history is being requested. Any other type of information may be contained within the request and provided to assist in locating the location information. All such information is contemplated as within the scope of the present disclosure.

The request may also contain preferences of the sender. In one embodiment, the request may contain a time period for which location information is desired. In another embodiment, the request may contain a location or an indication of a geographical area for which presence information associated with a mobile device is requested. In yet another embodiment, the request may contain an indication of the type of information requested. For example, the request may indicate that the sender wants to know whether the mobile device in question was at a particular location, or, alternatively, where the mobile device in question was during a specified time period. In still another embodiment, the request may contain an indication of the desired format of the results, such as a listing or a spreadsheet, and/or the means with which the results are to be provided, such as email or text message. Any and all such user or system preferences and/or indications, and all other forms of preferences and means of indicating such preferences are contemplated as within the scope of the present disclosure.

At block 420, the received request is evaluated to determine what information is requested and how to obtain such information. For example, the request may indicate location records for a specific time period are requested, so it may be determined that a particular database may be searched for a certain subset of records which may contain the requested information. Alternatively, it may be determined that a specific system must be accessed to acquire the requested information. Any evaluation and corresponding actions may be determined and all such evaluations and actions are contemplated as within the scope of the present disclosure.

At block 430, the location history information is collected. This may be a collection of time periods that a device was within a certain area, a listing of the locations where a device was active or operated, or any other collection of data that indicates the location of a device over any time period. All such data is contemplated as within the scope of the present disclosure.

At block 440, a response containing the location history is transmitted to the requestor. This may be a transmission to the requesting device, or to a separate device. The response transmission may be in a format specified in the request, and by a means specified in the request. Any response that effectively communicates the requested information, or a denial of the request for information, is contemplated as within the scope of the present disclosure.

Figure 5:
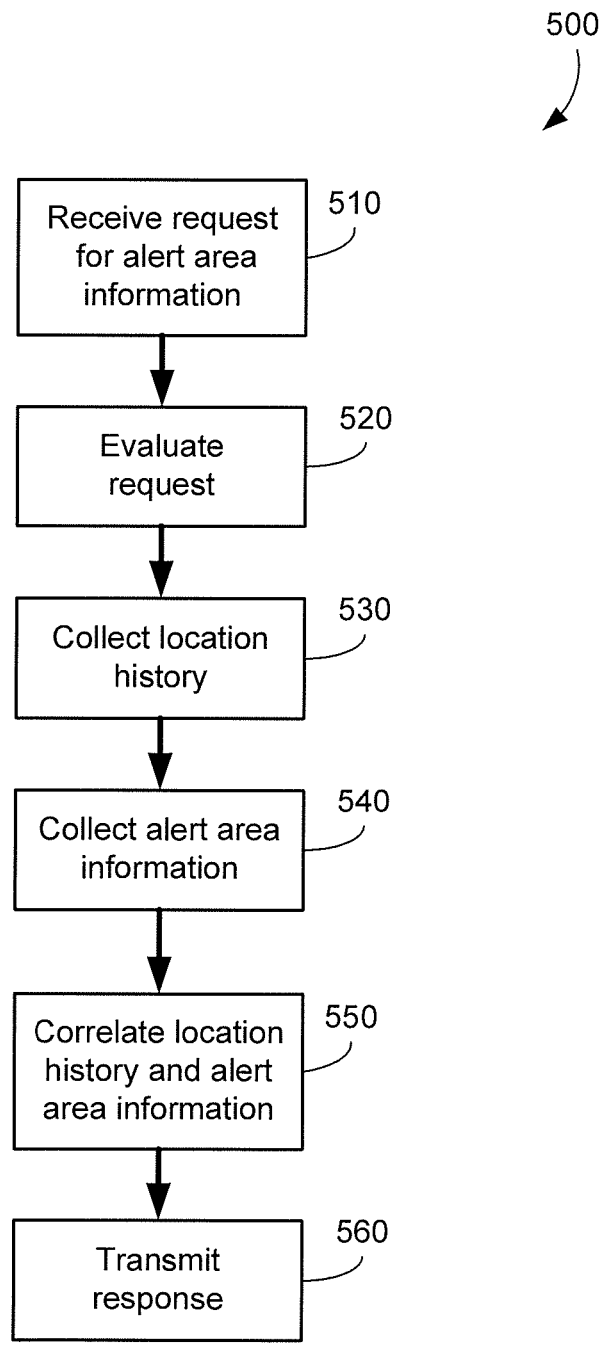
FIG. 5 is a flow diagram of an exemplary, non-limiting method of implementing the present subject matter.

FIG. 5 is a flow diagram of non-limiting, exemplary method 500 of implementing the present subject matter. At block 510, a request is received for alert area information. This may be a request by the user or operator of a mobile device to determine whether the mobile device, and therefore the user, was in an alert area. An alert area may be any area of interest, including an area affected by a release of a substance such as affected area 180. In one alternative, an alert area may be a legal boundary. For example, a parolee may be barred from leaving a city or state, and the request may inquiring as to whether the parolee's mobile device has been detected outside the city or state. Alternatively, a person subject to a restraining order may be prohibited from coming within a certain distance of a particular residence. The request may be a request to determine if that person has been in the vicinity of the residence. Any other such requests that inquire as to whether a device and/or the user of a device has been within or outside of a certain boundary is contemplated as within the scope of the present disclosure. The request may also contain preferences and indications as described herein with regard to FIG. 4 and elsewhere.

At block 520, the request is evaluated. As in FIG. 4, the request may be evaluated to determine what information is requested and how to obtain such information. The information may be collected at block 530, in the manner as described with regard to FIG. 4.

At block 540, alert area information is collected. This may be extracting geographical coordinates from reports of incidents, or inquiring of dedicated alert area resources, such as an alert area server, as to the location of current or past alert areas. Any such alert area information, and any other information that may assist in determining an area of interest, may be collected. All such data is contemplated as within the scope of the present disclosure.

At block 550, the location history information as collected at block 530 and the alert area information collected at block 540 is correlated, or otherwise evaluated, to determine if the overlap. For example, the location history information may be compared to the alert area to determine if any locations in the location history information are within the alert area. Temporal information may also be evaluated to determine if the device in question was in an alert area at specific times. For example, in a substance release situation, the substance may have dissipated within a specific amount of time. Therefore, if the device was within the alert area, but after the substance had dissipated, that location history information may not be used to determine if the device was in the alert area. Alternatively, alert area designations may have time limits such that once there is no significant amount of substance in an area, it is no longer designated an alert area. In alternative embodiments, time limits may be placed on area for legal or other reasons. For example, a person may not be permitted under a restraining order to enter a certain area in the evening. In that embodiment, the alert area may only be designated as such during daytime hours. Any other limitations and/or qualifications of an alert area are contemplated as within the scope of the present disclosure. Moreover, any other means and methods of correlating or otherwise evaluating a device history and/or presence of a device in an area are also contemplated as within the scope of the present disclosure.

At block 560, a response is sent to the requestor. Here again, the response may adhere to preferences indicated by the request received at block 510, and any number of responses in any format may be transmitted. The response may be sent to the requesting device or any other capable device. Any response that effectively communicates the requested information, or a denial of the request for information, is contemplated as within the scope of the present disclosure.

Other implementations of the present subject matter will be apparent to those skilled in the art and all such implementations are contemplated as within the scope of the present disclosure. For example, a parent may request location history information for a child's mobile device to determine if the child was exposed to a released substance, or merely to find out where the child has been. Alternatively, law enforcement may use an embodiment of the present subject matter to determine location histories of devices associated with criminals, parolees, or other persons of interest.

Figure 6:
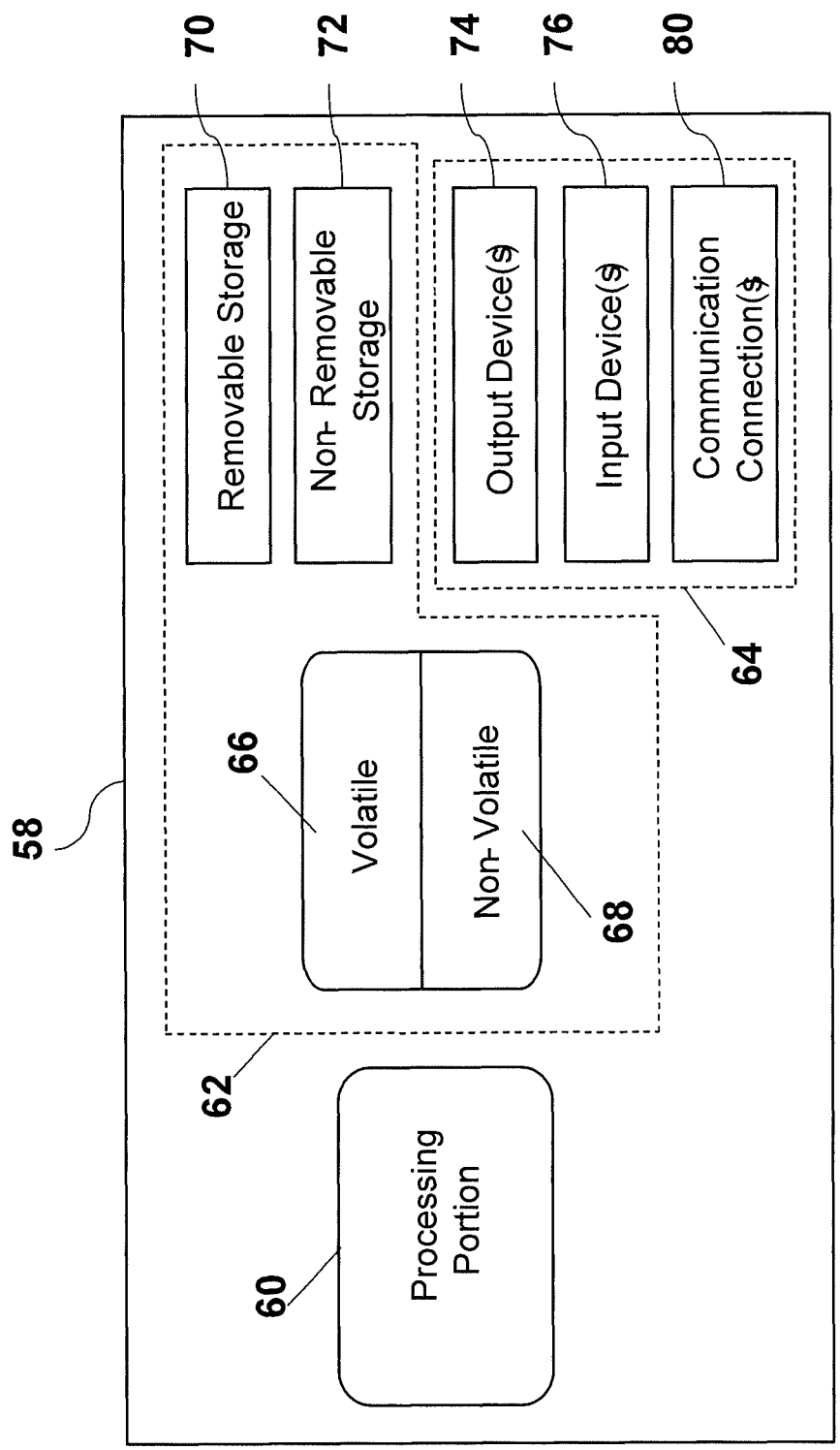
FIG. 6 is a block diagram of an example processor in which the present subject matter may be implemented.

FIG. 6 is a block diagram of an example processor 58 for determining previous occupation in or proximate to an alert area and transmitting or receiving such information as well as requests for such information to/from a wireless network. In an example configuration, the processor 58 may be one or more components of mobile device 120 and devices within network 150. It is emphasized that the block diagram depicted in FIG. 5 is exemplary and not intended to imply a specific implementation. Thus, the processor 58 can be implemented in a single processor or multiple processors. Multiple processors can be distributed or centrally located. Multiple processors can communicate wirelessly, via hard wire, or a combination thereof.

The processor 58 comprises a processing portion 60, a memory portion 62, and an input/output portion 64. The processing portion 60, memory portion 62, and input/output portion 64 are coupled together (coupling not shown in FIG. 6) to allow communications therebetween. The input/output portion 64 is capable of providing and/or receiving components utilized to determine or generate mobile device location information, determine previous occupation in or proximate to an alert area, and transmit or receive such information as well as requests for such information. For example, the input/output portion 64 is capable of providing/receiving mobile device 120 location information, accepting/receiving requests for location history information on/from mobile device 120, transmitting/receiving requests for location history information and the corresponding location history information, processing requests for location history information, and executing programs and applications related to determining previous occupation in or proximate to an alert area, or any combination thereof, as described above.

The processor 58 can be implemented as a client processor and/or a server processor. In a basic configuration, the processor 58 can include at least one processing portion 60 and memory portion 62. The memory portion 62 can store any information utilized in conjunction with determining previous occupation in or proximate to an alert area and transmitting or receiving such information as well as requests for such information. For example, as described above, the memory portion is capable of storing user device location information, a history of device location information, applications and software to determine previous occupation in or proximate to an alert area, or any combination thereof. Depending upon the exact configuration and type of processor, the memory portion 62 can be volatile (such as RAM) 66, non-volatile (such as ROM, flash memory, etc.) 68, or a combination thereof. The processor 58 can have additional features/functionality. For example, the processor 58 can include additional storage (removable storage 70 and/or non-removable storage 72) including, but not limited to, magnetic or optical disks, tape, flash, smart cards or a combination thereof. Computer storage media, such as memory portion 62, 70, 72, 66, and 68, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 58. Any such computer storage media can be part of the processor 58.

The processor 58 can also contain the communications connection(s) 80 that allow the processor 58 to communicate with other devices, for example through network 150. Communications connection(s) 80 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land-line telephone, and wireless media such as acoustic, RF, infrared, cellular, and other wireless media. The term computer readable media as used herein includes both storage media and communication media. The processor 58 also can have input device(s) 76 such as keyboard, keypad, mouse, pen, voice input device, touch input device, etc. Output device(s) 74 such as a display, speakers, printer, etc. also can be included.

The following description sets forth some exemplary telephony radio networks and non-limiting operating environments in which determining previous occupation in or proximate to an alert area may be implemented. The below-described operating environments should be considered non-exhaustive, however, and thus the below-described network architectures merely show how determining previous occupation in or proximate to an alert area can be incorporated into existing network structures and architectures. It can be appreciated, however, that determining previous occupation in or proximate to an alert area may be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of determining previous occupation in or proximate to an alert area may be applied independently of the method for data transport, and do not depend on any particular network architecture, or underlying protocols.

Figure 7:
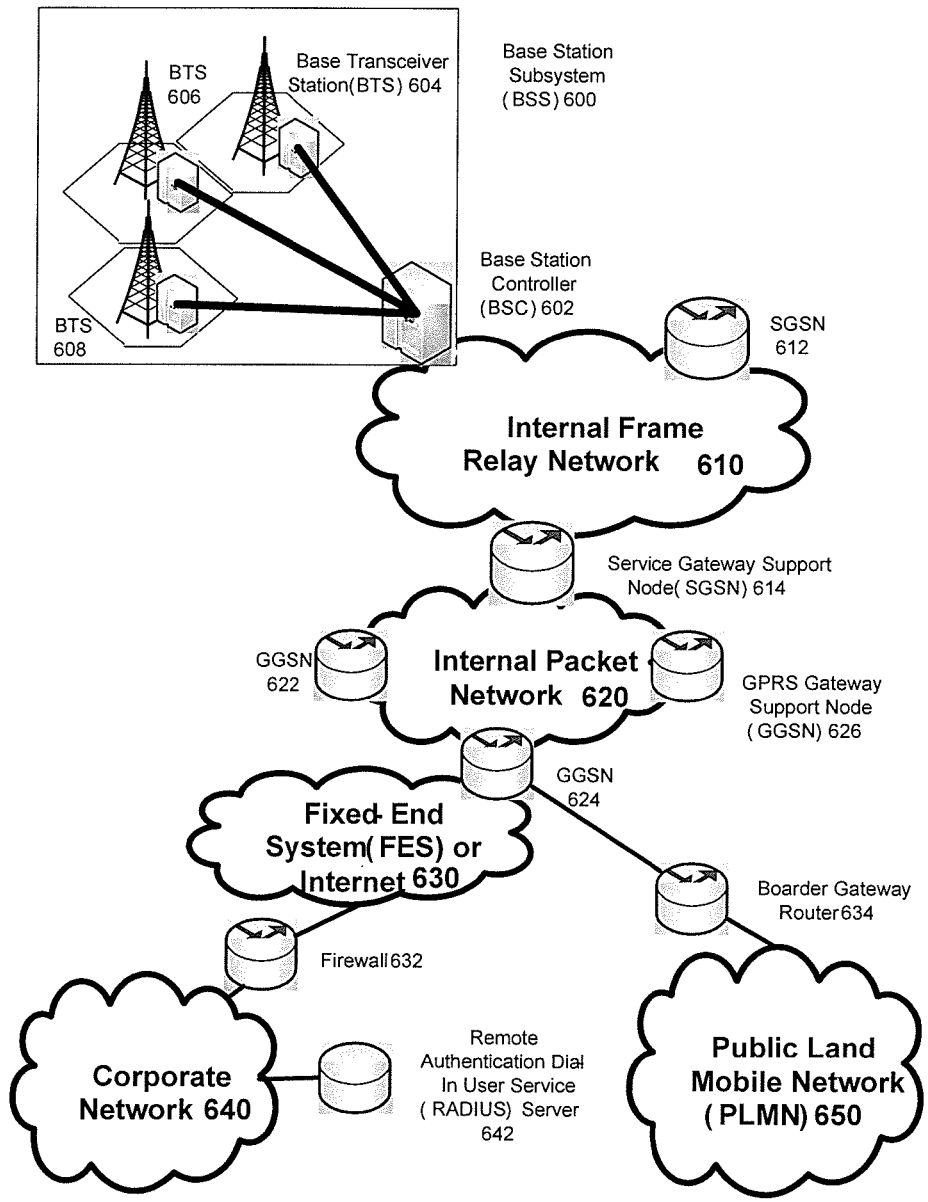
FIG. 7 is an overall block diagram of an exemplary packet-based mobile cellular network environment, such as a GPRS network, in which the present subject matter may be implemented.

FIG. 7 depicts an overall block diagram of an exemplary packet-based mobile cellular network environment, such as a GPRS network, in which a system for determining previous occupation in or proximate to an alert area may be practiced. In a non-limiting example configuration, network 150 comprises a cellular radio network and towers which are encompassed by the network environment depicted in FIG. 7. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., mobile device 120) become connected to the wireless network. In exemplary fashion, the packet traffic originating from user devices (e.g., mobile device 120) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via border gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 8:
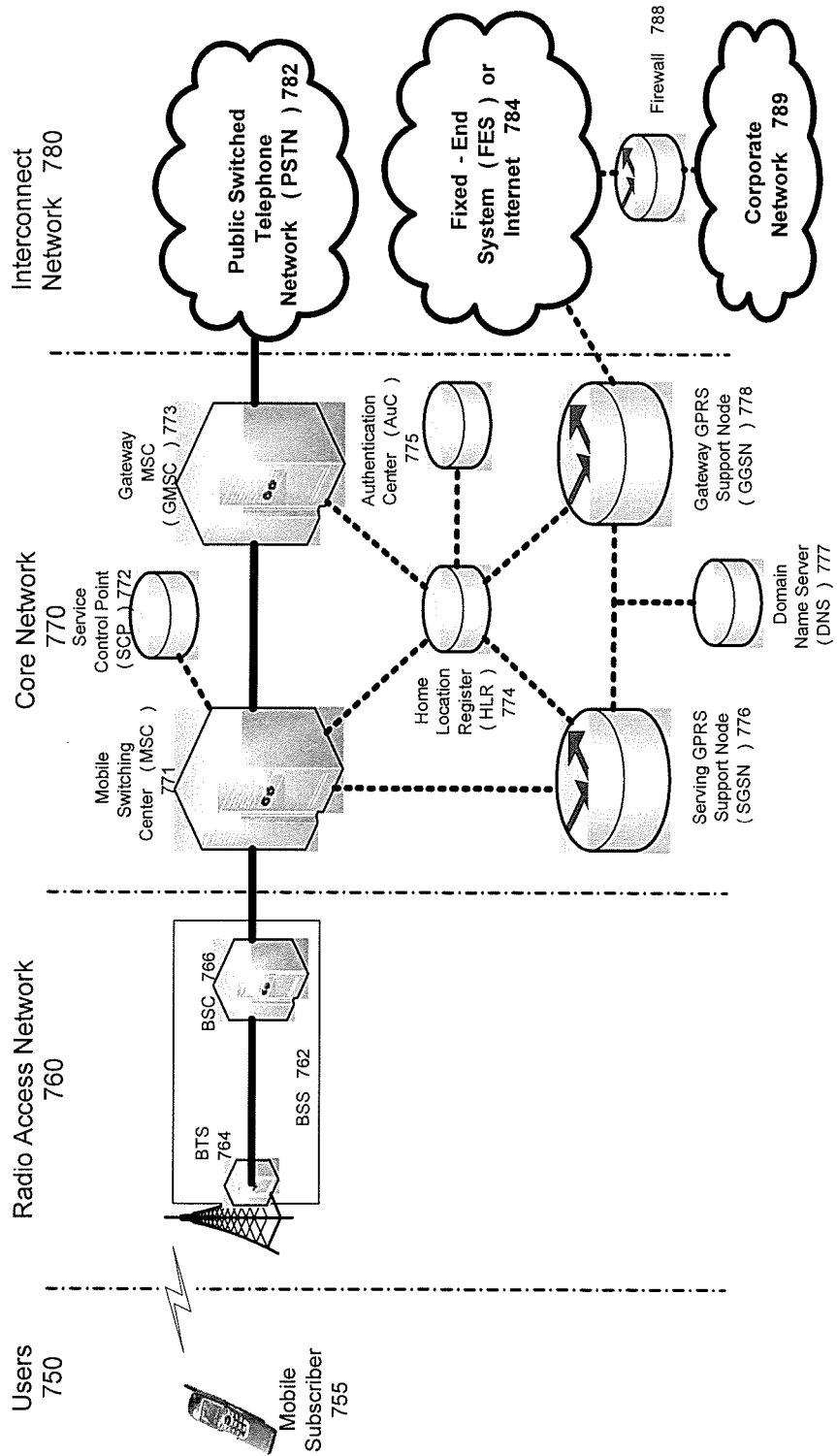
FIG. 8 illustrates an architecture of a typical GPRS network as segmented into four groups.

FIG. 8 illustrates an architecture of a typical GPRS network as segmented into four groups: users 750, radio access network 760, core network 770, and interconnect network 780. In one example configuration, network 150 is encompassed by the radio access network 760, core network 770, and interconnect network 780. Users 750 comprise a plurality of end users (though only mobile subscriber 755 is shown in FIG. 8). In an example embodiment, the device depicted as mobile subscriber 755 comprises mobile device 120. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 8, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user, such user 110, and sometimes to the actual portable device, such as mobile device 120, used by an end user of the mobile cellular service. When a mobile subscriber turns on his or her mobile device, the mobile device goes through an attach process by which the mobile device attaches to an SGSN of the GPRS network. In FIG. 8, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 8) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of determining previous occupation in or proximate to an alert area can include but are not limited to Gateway GPRS Support Node tables, Fixed End System router tables, firewall systems, VPN tunnels, and any number of other network elements as required by the particular digital network.

Figure 9:
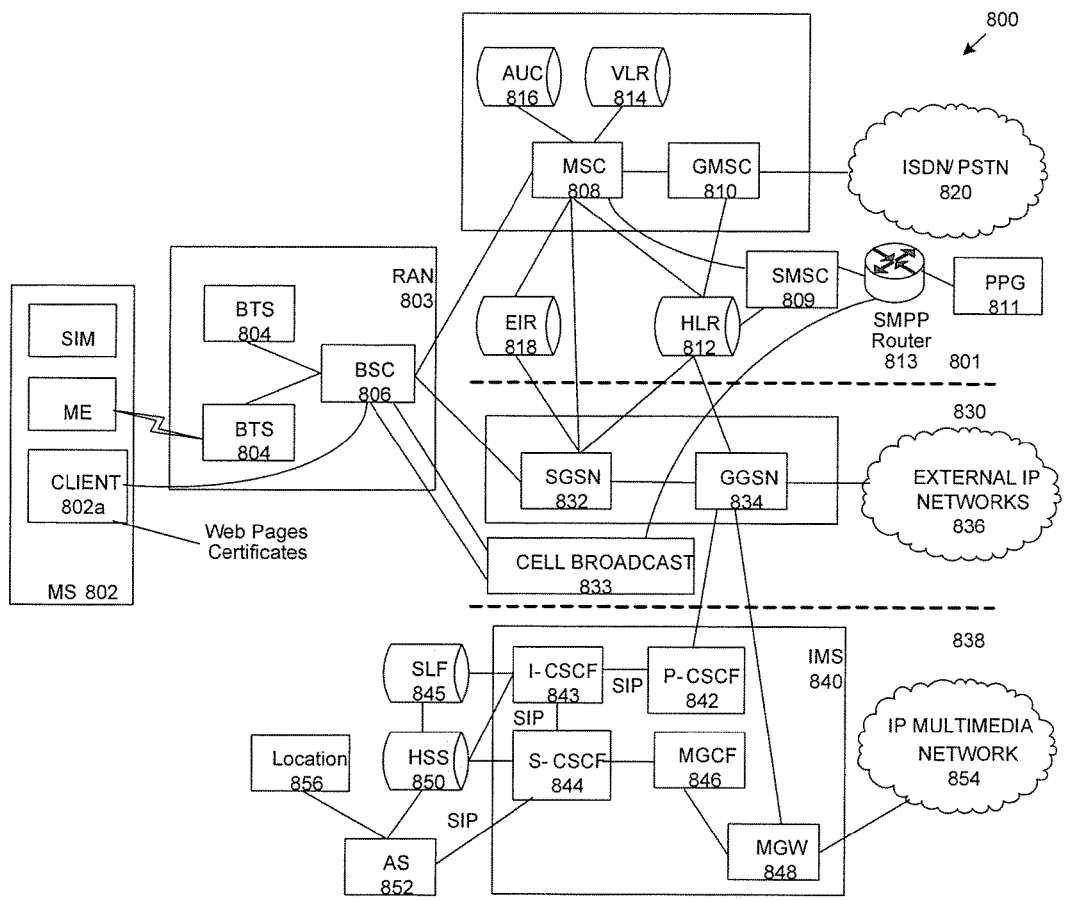
FIG. 9 illustrates an example alternate block diagram of an exemplary GSM/GPRS/IP multimedia network architecture in which the present subject matter may be implemented.

FIG. 9 illustrates another exemplary block diagram view of a GSM/GPRS/IP multimedia network architecture 800 in which determining previous occupation in or proximate to an alert area may be incorporated. As illustrated, architecture 800 of FIG. 8 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., mobile device 120) that is used by mobile subscribers, that may have a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AUC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictate to a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not have received pages from a circuit switched domain when engaged in a data call, since the MS is receiving data and is not listening to a paging channel. In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification.)

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown.) It also controls the media gateway (MGW) 848 that provides user-plane interworking functionality (e.g., converting between AMR- and PCM-coded voice.) The MGW 848 also communicates with other IP multimedia networks 854.

Push to Talk over Cellular (PoC) capable mobile phones register with the wireless network when the phones are in a predefined area (e.g., job site, etc.) When the mobile phones leave the area, they register with the network in their new location as being outside the predefined area. This registration, however, does not indicate the actual physical location of the mobile phones outside the pre-defined area.

While example embodiments of determining previous occupation in or proximate to an alert area have been described in connection with various computing devices, the underlying concepts can be applied to any computing device or system capable of implementing determining previous occupation in or proximate to an alert area. The various techniques described herein can be implemented in connection with hardware or software or, where appropriate, with a combination of both. Thus, the methods and apparatus for determining previous occupation in or proximate to an alert area and transmitting or receiving such information as well as requests for such information, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing determining previous occupation in or proximate to an alert area. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for determining previous occupation in or proximate to an alert area also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for determining previous occupation in or proximate to an alert area. When implemented on a general-purpose processor, the program code combines with the processor to provide a unique apparatus that operates to invoke the functionality of determining previous occupation in or proximate to an alert area. Additionally, any storage techniques used in connection with determining previous occupation in or proximate to an alert area can invariably be a combination of hardware and software.

While determining previous occupation in or proximate to an alert area has been described in connection with the various embodiments of the various figures, it is to be understood that other similar embodiments can be used or modifications and additions can be made to the described embodiment for performing the same function of determining previous occupation in or proximate to an alert area without deviating therefrom. For example, one skilled in the art will recognize that a system for implementing determining previous occupation in or proximate to an alert area as described may apply to any environment, whether wired or wireless, and may be applied to any number of devices connected via a communications network and interacting across the network. Therefore, determining previous occupation in or proximate to an alert area should not be limited to any single embodiment, but rather should be construed in breadth and scope in accordance with the appended claims.

What is claimed:

1. A method comprising:
    determining a first time associated with a release of a dangerous substance into an area;
    determining an alert area in which the dangerous substance has spread, wherein a geographic location of the alert area changes as a function of time;
    receiving, from a mobile device via a network, a request for a location history of the mobile device at a second time to determine if the mobile device was exposed to the dangerous substance, wherein the request is indicative of a user-defined response type, wherein the first time is prior to the second time, the location history comprising a listing of all locations where the network maintained contact with the mobile device over a specific period of time and temporal information associated with the listing;
    detecting interactions between the mobile device and a communications network;
    deriving the location history of the mobile device based on the interactions;
    evaluating the location history to determine if the mobile device was in the alert area at the specific period of time, wherein the specific period of time comprises a time at which the substance had not dissipated in the alert area;
    determining that the location of the mobile device at the first time does not correlate to the geographic location of the alert area; and
    providing a response to the mobile device in the user-defined response type according to the evaluation, wherein the response indicates that the mobile device was not proximate to the alert area at the first time.

2. The method of claim 1, wherein the response further indicates that the mobile device was proximate to the alert area at a third time.

3. The method of claim 1, further comprising providing the response to a device separate from the mobile device.

4. The method of claim 1, wherein the user-defined response type is email.

5. The method of claim 1, wherein determining if the location of the mobile device at the first time correlates to the geographic location of the alert area comprises determining the location of the mobile device at any time within a time boundary associated with the alert area.

6. A system configured to:
determine a first time associated with a release of a dangerous substance;
determine an alert area in which the dangerous substance has spread, wherein a geographic location of the alert area changes as a function of time;
receive, from a mobile device via a network at a second time, a request for a location history of the mobile device to determine if the mobile device was exposed to the dangerous substance, wherein the request is indicative of a user-defined response type, and wherein the first time is prior to the second time, the location history comprising a listing of all locations where the network maintained contact with the mobile device over a specific period of time and temporal information associated with the listing;
detect interactions between the mobile device and a communications network;
derive the location history of the mobile device based on the interactions;
evaluate the location history to determine if the mobile device was in the alert area at the specific period of time, wherein the specific period of time comprises a time at which the substance had not dissipated in the alert area;
determine that the location of the mobile device at the first time does not correlate to the geographic location of the alert area; and
provide a response to the mobile device in the user-defined response type according to the evaluation, the response indicating that the mobile device was not proximate to the alert area at the first time.

7. The system of claim 6, wherein the response further indicates that the mobile device was proximate to the alert area at a third time.

8. The system of claim 7, wherein the response is also provided to law enforcement.

9. The method of claim 1, wherein geographic location of the alert area is temporally bounded based on an amount of time the alert area may change size.

10. The system of claim 6, further comprising at least one subsystem that:
at a predetermined time, acquires the geographic location of the alert area and the first time;
acquires the location of the mobile device at the first time;
determines if the location of the mobile device at the first time correlates to the geographic location of the alert area; and
responsive to determining that the location of the mobile device at the first time correlates to the geographic location of the alert area, provides a notification to the mobile device.

11. A non-transitory computer-readable medium comprising computer-readable instructions for:
determining a first time associated with a release of a dangerous substance into an area;
determining an alert area in which the dangerous substance has spread, wherein a geographic location of the alert area changes as a function of time;
receiving, from a mobile device via a network at a second time, a request for a location history of the mobile device to determine if the mobile device was exposed to the dangerous substance, wherein the request is indicative of a user-defined response type, and wherein the first time is prior to the second time, the location history comprising a listing of all locations where the network maintained contact with the mobile device over a specific period of time and temporal information associated with the listing;
detecting interactions between the mobile device and a communications network;
deriving the location history of the mobile device based on the interactions;
evaluating the location history to determine if the mobile device was in the alert area at the specific period of time, wherein the specific period of time comprises a time at which the substance had not dissipated in the alert area;
determining that the location of the mobile device at the first time does not correlate to the geographic location of the alert area; and
providing a response to the mobile device in the user-defined response type according to the evaluation, the response indicating that the mobile device was not proximate to the alert area at the first time.

12. The non-transitory computer-readable storage medium of claim 11, the computer instructions further comprising instructions for determining the location of the mobile device is based on a location identifier and at least one time period during which the mobile device was within the location.

13. The non-transitory computer-readable storage medium of claim 11, wherein determining the first time comprises determining a time boundary for the alert area.

14. The non-transitory computer-readable storage medium of claim 13, wherein the response comprises the time boundary.

* * * * *